Feb. 20, 1945. L. O. GOFF ET AL Re. 22,605
METHOD OF AND APPARATUS FOR COATING SHEET MATERIAL
Original Filed April 23, 1938
Filed April 23, 1938
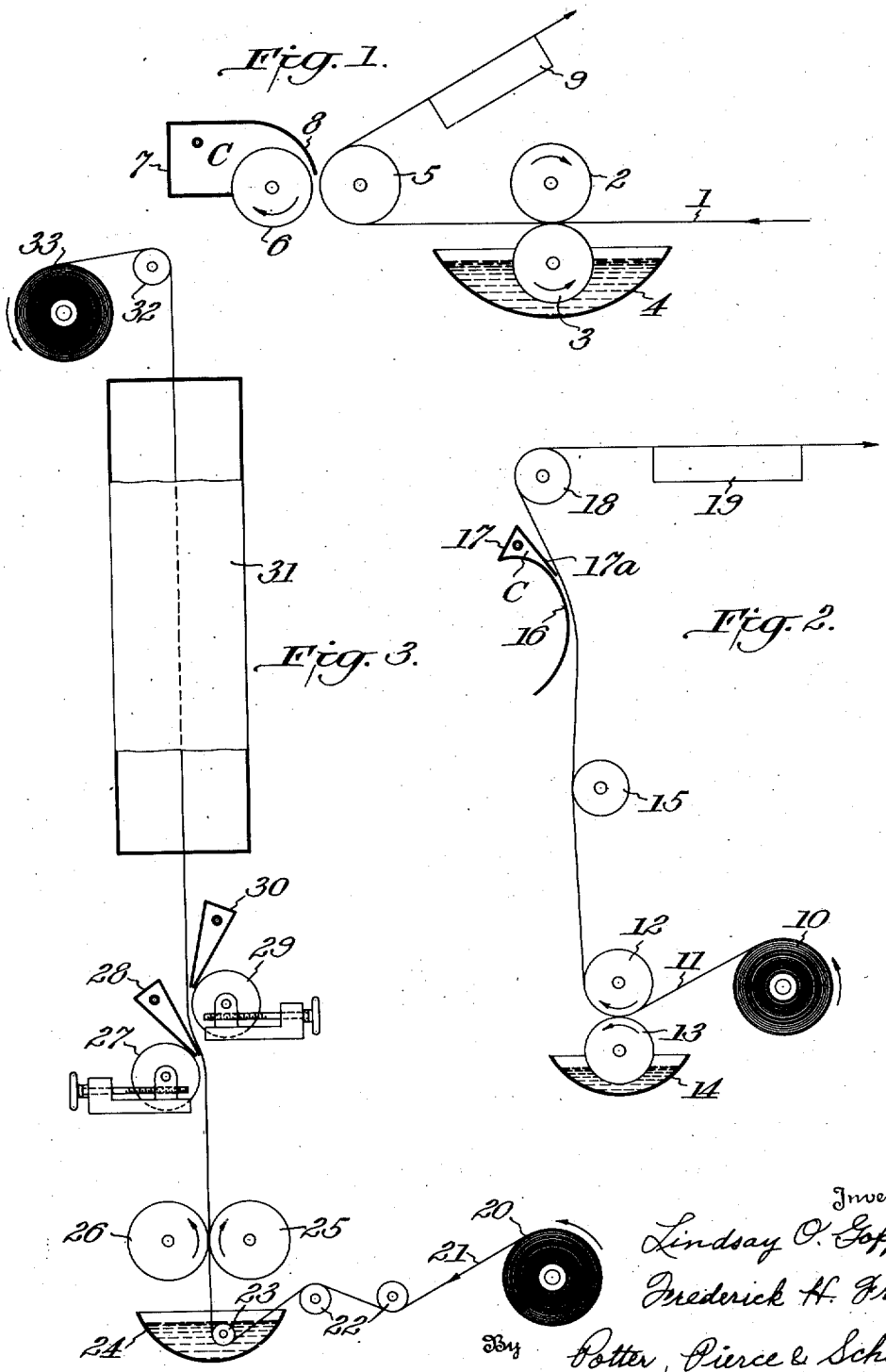
Inventor:
Lindsay O. Goff and
Frederick H. Frost
By Potter, Pierce & Scheffler
attorneys.

Reissued Feb. 20, 1945 Re. 22,605

UNITED STATES PATENT OFFICE 22,605

METHOD OF AND APPARATUS FOR COATING SHEET MATERIAL

Lindsay O. Goff, Westbrook, and Frederick H. Frost, Portland, Maine, assignors, by mesne assignments, to S. D. Warren Company, Boston, Mass., a corporation of Massachusetts Original No. 2,229,921, dated January 28, 1941, Serial No. 203,930, April 23, 1938. Application for reissue August 13, 1942, Serial No. 454,832

9 Claims. (Cl. 117—64)

This invention relates to a method of and apparatus for coating sheet material. The invention is especially advantageous for use with flexible sheets such as woven or felted material, e. g., paper, homogeneous films or pellicles, and the like.

It is an object of the present invention to provide an improved method of smoothing a layer of mobile coating supported on a sheeted base. Another object of the invention is the provision of a smoothing method making possible the substantially simultaneous smoothing of mobile coating composition layers on opposed surfaces of a sheeted base. A further object of invention is the provision of apparatus adapted to carry out such method.

In the manufacture of certain grades of paper or in the treatment of various other flexible sheet materials such as textiles, cellulosic or resinous sheets, and the like, it is customary to apply a surface layer or coating to the base sheet. In such practice, the solid matter comprising the coating is rendered mobile, i. e., fluid or at least plastic, by heat or by dispersion and/or solution in a suitable liquid medium, and the resulting mobile composition is applied to the sheet material where it hardens or dries in situ.

A widely used method of coating flexible sheets is that disclosed by Lebel in U. S. Patent No. 1,980,923, issued November 13, 1934. That method, in brief, comprises applying a fluid coating composition to one side of a flexible web, and supporting the reverse side of the web while the sheet is carried past an air-jet which extends across the width of the web and which is directed at the coated surface at an oblique angle. The air-jet smooths the layer of fluid coating composition; preferably, it actually "cuts away" a predetermined part of the coating composition—which has been applied in excess—and redistributes, evens and smooths the residual quantity of coating composition on the web in a smooth, uniform layer. This method ordinarily yields a very excellent coated product; a limitation of the process is that only one side of the sheet can be coated at a time, owing to the fact that the back of the web must be supported while the air-jet is acting on the freshly coated side.

While, in the process just referred to, the preferred practice is to apply fluid coating composition in excess and actually to cut away the excess by means of an air-knife, the preferred practice in the present invention is to use a flow of air merely to smooth the previously applied layer of coating composition without removing any excess. The action is not one of "cutting" or limiting but the gentler action of leveling the surface; consequently the process may, if desired, be practiced without providing a support for the back of the sheet during the smoothing operation. Hence, since the back of the sheet needs no support, it becomes possible by this invention to coat simultaneously both sides of the sheet by applying a layer of the mobile coating composition to each side of the sheet and then substantially simultaneously smoothing the opposed layers by the passing thereover of the aforesaid leveling currents of gas or vapor.

According to the present invention a mobile coating composition is applied to a moving web of sheet material; the web is conducted past an air-stream directed through a narrow path or channel bounded on one side by the moving web and on the other side by a confining member and in such direction with respect to the web as to be almost parallel (i. e., at not more than a very small angle of divergence), the velocity of the air-stream being sufficient to smooth out irregularities in the layer of mobile coating composition on the web; and the coating is then dried or otherwise hardened. Preferably, said confining member is characterized by having a curved surface in that portion thereof nearest the web being coated which curve is convex with respect to the web. The curved surface and web form a "throat" passageway therebetween, the passageway being characterized by the fact that the curved surface gradually approaches the web until a point of maximum constriction is reached after which the curved surface gradually diverges from the web.

Air (or other suitable gas, or suitable vapor) is introduced under pressure, as a stream or jet, into one side of the above-described "throat," and passes through the same past the maximum constriction, and is emitted on the other, open, side of the throat. The air stream, accordingly, is substantially parallel with, or tangent to, the mobile coating layer carried by the web at the point of maximum restriction of the throat, and impinges upon the layer, if at all, at only a very small angle.

The invention will be described hereinafter with greater particularity and with reference to the accompanying drawing, in which Fig. 1 is a diagrammatic representation of an apparatus adapted for use in carrying out one-side coating of flexible sheet material by the process of the present invention;

Fig. 2 is a diagrammatic representation of a modification of the apparatus illustrated in Fig. 1; and Fig. 3 is a diagrammatic representation of an apparatus adapted for use in carrying out two-side coating of flexible sheet material by the process of the present invention.

In Fig. 1, the numeral 1 represents a web of flexible sheet material to be coated, said web being moved (by conventional apparatus not shown) in the direction from right to left as indicated by the arrow. 2 and 3 represent a pair of opposed rollers whose long axes are substantially parallel to each other and to web 1 and are substantially transverse to web 1: these rollers provide a nip through which web 1 is passed. Roller 3 dips into a vat 4 containing the mobile coating material, while roller 2 functions as a back-up or supporting member to provide a non-yielding backing for the web 1 at the time of application of the mobile coating material to the latter. Rollers 2 and 3 are conventionally mounted and are rotatable: as indicated in Fig. 1, they may be caused to rotate in the direction of travel of web 1. 5 represents an idler supporting roller about which web 1 is flexed subsequent to the application of mobile coating composition to one surface of the web: in its passage over supporting roller 5 web 1 contacts the same on its uncoated side.

Opposed to supporting roller 5 is a roller 6 substantially parallel to but spaced from roller 5 to provide therebetween a gap somewhat wider than the web plus mobile coating layer is thick. Roller 6 is as long as the web 1 is wide, and is coextensive with the web: it is journaled for rotation in suitable bearings (not shown) and may be provided with conventional means (not shown) for its positive rotation, e. g., in a direction opposed to the direction of travel of web 1.

Roller 6 constitutes an element of a means for discharging a stream of air countercurrently with respect to the direction of travel of the web. This means may, as illustrated, comprise a housing 7 which encloses a substantial part of roller 6 and forms with the latter an air chamber C, said housing terminating on the trailing side of roller 6 in a convexly curved lip portion 8 which is spaced from the surface of roller 6 to provide an air outlet from air chamber C, which outlet directs the current of air between roller 6 and web 1. The air discharge and curved surface may be formed of a curved metal sheet in co-operation with appropriate end members for "boxing in" the space, said metal sheet having its convexly curved end disposed adjacent to but spaced from the roller 5 and having the trailing edge bent back upon itself as at 8 to form an air chamber. The edge of the reversely bent portion terminates short of the nip between the rollers 6 and 5. The assembly 6—7—8 may be made substantially free from leakage by providing flexible (e. g., rubber) sealing strips on the parts of the stationary housing adjacent the roller 6. Conventional means (not shown), such as an air pump or blower with appropriate conduits, is provided for supplying chamber C with air under pressure. Numeral 9 diagrammatically represents a conventional suction apron for pulling the web taut before the web is fed to a drier (not shown).

In operating the process when used the apparatus shown in Fig. 1, the web 1 is passed between rollers 2 and 3; roller 3, rotating in vat 4 containing mobile coating composition, lifts a layer of the composition from the body thereof and applies it to the adjacent surface of the web. The amount of mobile coating composition so lifted and applied may be determined by appropriate control of the viscosity of the composition, temperature of the composition, humidity of the web, the speed of travel of roller 3, and other variables. The web passes around supporting roller 5 with the coated side adjacent but not touching roller 6. Roller 6 rotates in the direction opposite to the travel of the web 1. A blast of air delivered from compressed air chamber 7 rushes between roller 6 and the web on roller 5. The air-current between the roller-face and the web acts in effect as if the roller 6 itself touched the sheet with a fluid face. That is, the air-stream itself acts like a "pneumatic roll" and wipes the surface of the coating smooth. Another way of looking at the process is to consider that the roller 6 forms one lip and one side of the throat, and the sheet material forms the other lip and the other side of the throat of an elongated, rectilinear nozzle through which the air rushes. The flow of air smooths the coating layer by attrition. After the smoothing operation the web is dried in any suitable conventional manner.

It will be apparent that if the velocity of the air flow is sufficiently high the coating on the web not only will be smoothed but the actual quantity thereof on the web may be reduced, as the excess may be pushed back by the air-blast. This case avoids the use of other means to limit the quantity of coating applied. Such practice, however, is less economical in the use of air and is usually not to be preferred.

It is preferred to have roller 6 rotate, for this aids in sweeping the air through the passage between the roller and the web and so permits the use of lower air pressures than would otherwise be required. Moreover, the rotating roller apparently decreases the tendency towards turbulence in the air-stream leaving the nip between the roller and the web, and so lessens the possibility of undesirable vibrations in the web. Nevertheless, in most cases very satisfactory results are obtained even if roller 6 is not rotated but rather is held stationary.

Likewise, roller 6 may be replaced by some other rigid and smoothly curving surface, as for example, the surface 16 in Fig. 2. It is apparent that in such a case the effect of the emitted air on the coating is the same as before, but that to obtain the same air velocity it may be necessary to supply higher pressure air at the nozzle.

Instead of being supported by a roller while its layer of mobile coating is being smoothed by the air-stream, the web may be held in position merely by tension, as shown in Fig. 2.

In Fig. 2, the numeral 10 represents a reel carrying a rolled up supply of paper web 11. Rollers 12 and 13 and vat 14 are counterparts of rollers 2 and 3 and vat 4, respectively, of Fig. 1. 15 and 18 are tensioning rollers on either side of the smoothing device C—16, the rollers 15 and 18 being appropriately mounted for adjusting the tension on web 11 and therefore for controlling the relationship between web 11 and said smoothing device. This latter consists essentially of an air chamber C which in cross-section will be seen to be bounded by a bent metal sheet 17 one end of which terminates in a convexly curved surface 16 of relatively large radius and the other end, 17a, of which terminates adjacent to but spaced from curved surface 16 and on the trailing side of the curved surface: suitable end pieces (not shown) serve in cooperation with element 17, to provide a confining space or air chamber to which air under pressure may be fed for release through the rectilinear slot between edge 17a and curved surface 16 as an air blast sweeping over the coated surface of web 11. 19 is a conventional suction apron for pulling the web taut before the same is fed to a drier (not shown).

In operation, web 11 is advanced, from reel 10 through a nip between rollers 12 and 13, whereby to one surface thereof is applied a layer of mobile coating composition, passes over roller 15, past curved surface 16 and the slot between the latter and edge 17a, whereupon the layer of mobile coating is smoothed by the action of the airblast from chamber C sweeping between web 11 and curved surface 16, thence over tensioning roller 18 and thereafter into operative relation with the suction apron 19. In this case the air blast just described serves to space pneumatically the coating on web 11 from curved surface 16 against the tension exerted upon the web by means of tensioning rollers 15 and 18.

Except in the special case where an excess of coating has to be removed by the air, the airstream may, if desired, flow with the direction of paper travel instead of opposite thereto.

In Figs. 1 and 2 the roll or rigid side of the air duct has been shown as an integral part of the air "nozzle". It should be obvious, however, that an air delivering device entirely separate from the roller or other convexly curved rigid member may be inserted into the opening between the latter and the web, as shown in Fig. 3. Such practice is less economical in the use of air and the apparatus is more cumbersome, but the same effects with respect to the smoothing of the coating on the paper can be obtained thereby.

Since the invention does not require the use of a rigid support for the web passing the airstream, this method lends itself well to two-side coating. Fig. 3 illustrates such two-side coating. In this figure, reference numeral 20 represents an unwind reel carrying a web of paper 21; 22, 22 are guide and/or tensioning rollers; 23 is a submerged guide roller in coating-containing vat 24; 25 and 26 are opposed squeeze rollers; 27 and 29 are rollers cooperating with web 21 to form "nozzles" for air streams directed thereinto by conventional air nozzles 28 and 30, respectively; 31 is a drying tower; 32 is a guide roller and 33 is a wind-up reel. Rollers 27 and 29 are staggered in the direction of travel of web 21 and are so disposed with respect to the latter as to be adjacent the one side and the other side, respectively, of web 21.

In operation, web 21 from unwind reel 20 passes over guide rolls 22, 22 and under roll 23, which latter is submerged in a body of fluid coating composition in vat 24. The web, covered on both sides with excess coating composition, then passes between adjustable squeeze rollers 25 and 26 which limit the weight of coating composition left on the web to the desired amount, but do not leave the surface of the coating as level as desired. The web is then passed adjacent roller 27 but is prevented from touching the latter by a stream of air from nozzle 28 set above and on the trailing side of roller 27. The air blast passing between web 21 and roller 27 smooths the coating on the side of the sheet on which it acts and cushions the web and coating from actual contact with the surface of roller 27. The web then passes with its other side adjacent the similar roller 29 having nozzle 30 above it. Air, issuing between web 21 and roller 29, from nozzle 30, smooths the coating on that side of the sheet and spaces it from roller 29. The web is held in the desired position adjacent rolls 27 and 29 by the tension under which it is pulled through the system. The web is then passed into a suitable drier, such as tower 31 in which hot air currents dry the sheet and coating, thence over guide roller 32 and wound upon reel 33.

Rolls 27 and 29 are mounted so that they can be moved nearer to or farther from the surfaces of the web as desired. In some cases it may be desired to have roll 27 exactly opposite roll 29; although such a set-up requires that considerable care must be taken in regulating the flow of the two air streams in order to avoid objectionable fluttering of the web being smoothed. Fluttering may be lessened in some cases by directing in opposite directions the air-streams on the two sides of the web—that is, by directing one stream against the travel of the web and the other stream with the travel of the web.

In certain cases, as for instance, when a thermoplastic coating is being used, it may be advantageous to heat the blast of air or even to employ steam to smooth the coating. As will be obvious, the gas or vapor employed for the smoothing operation may be selected from a group of operable gases and vapors, and the invention is not restricted to employment of air or steam as such media.

It is obvious that the space between the sheet and the confining member, the volume of air used, and the velocity of the air passing through the channel between the sheet and the confining member are mutually interdependent. Generally speaking, in the interest of economy it is desirable to limit the width of the air channel and the volume of air used to the minimum points consistent with desired air velocity and satisfactory mechanical operation. The required velocity will vary widely depending upon several factors including the viscosity of the coating on the sheet, the speed at which the sheet is moving, and the like.

A specific instance of the practice of the invention is given below:

Paper of a quality very generally used as base-stock for coated paper was coated by a set-up similar to that shown in Fig. 1. An aqueous suspension of 41% solids comprising china clay, blanc fixe, satin white, and casein was applied in sufficient quantity to give when dried a coating of 15 pounds on 500 sheets cut "25 x 38". The web traveled at 285 feet per minute. The gap between the web 1 and roller 6 was 2 mm.; the velocity of the air through the gap was 700 feet per second; the peripheral speed of roller 6 was 300 feet per minute. The coating was satisfactorily smoothed and leveled by the action of the air blast issuing from said gap.

We claim:

1. Process for coating both surfaces of flexible sheeted materials including paper and the like with mobile coating composition which comprises applying layers of mobile coating composition to both surfaces of the sheet, while the same is being continuously forwarded, and maintaining the coating composition-carrying sheet under tension while countercurrently sweeping currents of air over the coating layers of the tensioned sheet along paths which are convexly curved with respect to the planes of the layers, while the latter are still mobile, whereby to smooth and level the layers, the air currents acting successively on the layers and each air current serving to flex the tensioned coating-carrying sheet out of mechanical contact with adjacent equipment.

2. The process defined in claim 1, in which subsequent to the step of smoothing and leveling the coatings the coated sheet is subjected to a drying treatment while being maintained out of physical contact with any solid object.

3. Modification of the process defined in claim 1, according to which the layers of mobile coating composition are roughly limited as to thickness prior to their being smoothed and leveled by the air currents.

4. In an apparatus for coating a surface of a flexible sheeted material such as paper or the like with coating composition, of the class including means for continuously forwarding the sheet, means for applying a layer of mobile coating composition to a surface of the sheet while the same is being forwarded, and means for smoothing and leveling the layer while the latter is still mobile, the combination wherein the smoothing and leveling means consists essentially of a convexly curved confining surface the long axis of which is substantially transverse to and parallel with the plane of the sheet, said confining surface being co-extensive in width with the width of the sheet and forming with the latter a throat which is elongated in the direction of travel of the sheet and which is characterized in cross section by progressive longitudinal constriction from the ends toward the mid-point thereof, means to direct a stream of air under pressure longitudinally into said throat for passage through the most restricted portion of said throat and emission at the remote end of said throat, and tensioning means tending to move the sheet toward and into contact with said convexly curved confining surface.

5. In an apparatus for coating flexible sheeted material such as paper or the like with coating composition, of the class including means for continuously forwarding the sheet, means for applying a layer of mobile coating composition to a surface of the sheet while the same is being forwarded, and means for smoothing and leveling the layer while the latter is still mobile, the combination wherein the smoothing and leveling means consists essentially of a cylindrical roller the long axis of which is substantially transverse to and parallel with the plane of the sheet, said cylindrical roller being co-extensive in length with the width of the sheet and arranged to form with the latter a throat which is elongated in the direction of travel of the sheet and which is characterized in cross section by progressive constriction of the passageway between the cylindrical roller and the sheet from the ends thereof toward the central portion, and means for causing an air stream substantially coextensive with the width of the sheet to sweep longitudinally into said throat for passage through the most restricted portion of said throat and emission at the remote side of said throat.

6. In an apparatus for coating flexible sheeted material such as paper or the like with coating composition, of the class including means for continuously forwarding the sheet, means for applying a layer of mobile coating composition to a surface of the sheet while the same is being forwarded, and means for smoothing and leveling the layer while the latter is still mobile, the combination wherein the smoothing and leveling means consists essentially of a cylindrical roller the long axis of which is substantially transverse to and parallel with the plane of the sheet, said cylindrical roller being co-extensive in length with the width of the sheet and arranged to form with the latter a throat which is elongated in the direction of travel of the sheet and which is characterized in cross section by progressive constriction of the passageway between the cylindrical roller and the sheet from the ends thereof toward the central portion, means for advancing and retracting the cylindrical roller with respect to the sheet, and means for directing a stream of air under pressure substantially coextensive with the width of the sheet longitudinally into said throat for passage through the most restricted portion of said throat and emission at the remote side of said throat.

7. In an apparatus for coating flexible sheeted material such as paper or the like with coating composition, of the class including means for continuously forwarding the sheet, means for applying a layer of mobile coating composition to a surface of the sheet while the same is being forwarded, and means for smoothing and leveling the layer while the latter is still mobile, the combination wherein the smoothing and leveling means consists essentially of a convexly curved confining surface the long axis of which is substantially transverse to and parallel with the plane of the sheet, said confining surface being co-extensive in length with the width of the sheet and arranged to form with the latter a throat which is elongated in the direction of travel of the sheet and which is characterized in cross section by progressive constriction of the passageway between the curved surface and the sheet from the ends thereof toward the central portion, a housing defining, in association with a portion of said convexly curved confining surface a compressed air chamber on the side of said curved surface which is remote from said coating-applying means, the outlet of which compressed air chamber is in the constricted portion of said throat, means for delivering air under pressure to said compressed air chamber for passage through said outlet and said restricted portion of the throat and emission at the remote end of said throat, and tensioning means tending to move the sheet toward and into contact with said convexly curved confining surface.

8. In an apparatus for coating both surfaces of a flexible sheeted material such as paper or the like with coating composition, of the class including means for continuously forwarding the sheet, means for applying layers of mobile coating composition to the surfaces of the sheet while the same is being forwarded, and means for smoothing and leveling the layers while the latter are still mobile, the combination wherein the smoothing and leveling means consists essentially of at least two convexly curved confining surfaces the long axis of each of which is substantially transverse to and parallel with the plane of the sheet, said confining surfaces being co-extensive in length with the width of the sheet and forming with the latter, on either side thereof, throats each of which is elongated in the direction of travel of the sheet and which is characterized in cross section by progressive constriction of the passageway between the curved surface and the sheet, from the ends thereof toward the central portion, said convexly curved confining surfaces being staggered in the direction of travel of the sheet, plural means for directing streams of air under pressure substantially co-extensive with the width of the sheet longitudinally into said throats for passage through the most restricted portions of said throats and emission at the remote ends of said throats, and tensioning means tending to move the web toward and into contact with said convexly curved confining surfaces.

9. In apparatus of the class described, means for imparting translatory motion to the sheet to be coated, said means including a rigid support for the sheet which contacts one side only of the sheet, a doctor arranged in juxtaposition to said support, means for applying an excess of fluid coating material to the other side of the moving sheet, and means for creating a differential in air pressure on opposite sides of said doctor to develop a stream of air between said doctor and said support in a direction counter to the direction of movement of the sheet.

LINDSAY O. GOFF.
FREDERICK H. FROST.